Figure 1:
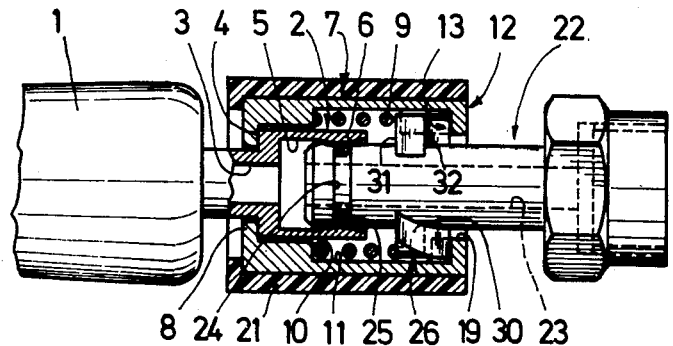

United States Patent [19]
Schulze et al.

[11] Patent Number: 4,566,723
[45] Date of Patent: Jan. 28, 1986

[54] COUPLER FOR HOSE LINES OF HIGH-PRESSURE CLEANING AND SPRAYING EQUIPMENT

[75] Inventors: Werner Schulze, Winnenden-Höfen; Josef Gerich, Winnenden; Emil Scheef, Waiblingen; Heinz Dautel, Backnang, all of Fed. Rep. of Germany

[73] Assignee: Alfred Kärcher GmbH & Co., Winnenden, Fed. Rep. of Germany

[21] Appl. No.: 512,938

[22] Filed: Jul. 12, 1983

[30] Foreign Application Priority Data

Jul. 16, 1982 [DE] Fed. Rep. of Germany ....... 3226571

[51] Int. Cl.⁴ .............................................. F16J 15/00
[52] U.S. Cl. ........................................ 285/86; 285/361
[58] Field of Search ............... 285/360, 361, 376, 396, 285/401, 402, 316, 317, 86

[56] References Cited

U.S. PATENT DOCUMENTS

| 782,555 | 2/1905 | Gooch | 285/360 |
|---|---|---|---|
| 2,367,458 | 7/1943 | Coplen | 285/361 |
| 2,843,401 | 7/1958 | Rogers | 285/82 |
| 3,097,001 | 7/1963 | LeBus, Sr. | 285/361 |
| 3,858,910 | 1/1975 | Oetiker | 285/376 |
| 4,477,109 | 10/1984 | Kleuver | 285/361 |

FOREIGN PATENT DOCUMENTS

| 583550[U] | of 0000 | Fed. Rep. of Germany. | |
|---|---|---|---|
| 1096128 | 12/1960 | Fed. Rep. of Germany ... | 285/332.3 |
| 2164378 | 6/1973 | Fed. Rep. of Germany ...... | 285/174 |
| 6802718[U] | of 0000 | Fed. Rep. of Germany. | |

Primary Examiner—Cornelius J. Husar
Assistant Examiner—Eric K. Nicholson
Attorney, Agent, or Firm—Kenway & Jenney

[57] ABSTRACT

It is suggested in relation to a coupler for hose lines of high-pressure cleaning equipment and high-pressure spraying equipment comprising a nipple and a connecting piece to be coupled to the latter that the nipple be captured by a sleeve containing catch projections with recesses extending into its interior, that a compression spring be positioned between the inner wall of the sleeve and the nipple, that the connecting piece have on its outer wall outwardly projecting catches with locking lugs which slip into the recesses in the catch projections, and that the compression spring push the locking lugs into the recesses in the catch projections when the connecting piece is inserted into the sleeve.

8 Claims, 5 Drawing Figures

COUPLER FOR HOSE LINES OF HIGH-PRESSURE CLEANING AND SPRAYING EQUIPMENT

The invention relates to a coupler for hose lines of high-pressure cleaning and spraying equipment Hose couplers must be used for high-pressure cleaning equipment and high-pressure spraying equipment that are specially designed for this particular application. First, it is important that a secure and reliable connection can be achieved that can nevertheless be easily released when the system is depressurized. It is also essential that such hose couplers be particularly simple in construction, since with complicated designs containing many moving parts the danger exists that the operability of the coupler may be impaired by chemical deposits. Finally, it is vital that hoses other than those specially designed for high-pressure cleaning equipment not be capable of accidental attachment to the high-pressure cleaning equipment, since only specially designed high-pressure hoses can withstand the high pressures and aggressive conditions encountered during the operation of high-pressure cleaning equipment.

Hose couplers are known which consist of a nipple containing a groove, on one hand, and a sleeve containing radial holes, on the other, in which balls project through the radial holes into the cavity within the sleeve, which by means of a sliding, conically formed and spring-loaded sleeve are, depending on the position of the latter, pressed inwardly or, in the open position, spread sufficiently in a radial direction to allow insertion of the nipple. After the nipple is inserted and the outer sliding sleeve released, the balls are pressed into the groove in the nipple by the sliding sleeve and produce a positive connection. When couplers of this type are used with high-pressure cleaning equipment, it proves to be disadvantageous that the couplers contain a relatively large number of moving parts. The outer sliding sleeve and the balls, in particular, can become jammed as a result of lime and cleaning material deposits, so that operational reliability of this type of coupler is not always guaranteed.

In other known high-pressure hose couplers, a sealing cone is pressed onto a conical sealing surface by means of a threaded fitting. To release and connect this type of hose coupler, several turns of a coupling ring are required; every coupling or releasing process therefore takes a considerable amount of time.

It is therefore the object of the invention to suggest a hose coupler especially suited for high-pressure cleaning and high-pressure spraying equipment, which is insensitive to high pressures and to chemical and lime deposits, but which on the other hand permits quick, reliable and non-interchangeable connection of hose lines.

This object is achieved according to the invention with a coupler comprising a nipple, a sleeve, a compression spring, and a connecting piece, wherein the nipple is attached to the end of one hose and has an inner throughhole which forms a sealing surface with the connecting piece which is attached to a second hose, wherein the sleeve surounds the nipple and is secured against displacement away from the first hose, wherein the sleeve and connecting piece have complementary catch projections, and wherein the compression spring pushes the sleeve and connecting piece apart to engage the catch projections to form a leakproof connection between the nipple and the connecting piece.

The hose coupler of the invention is of extremely robust construct and consists of only a few parts which can be assembled very simply. The hose coupler is thereby protected automatically in operation, since the two hose ends are drawn apart by pressurization of the hose line, so that the locking lugs on one hose section snap into the recesses in the catch projections on the other section. This locking prevents rotation of the two hose ends about their longitudinal axis, and therefore release of the hose coupler as well, since to release the hose coupler the hose ends must not only be displaced axially in relation to one another, but also turned in relation to each other about their longitudinal axis.

In an advantageous elaboration, provision is made for the sleeve to slide axially on the nipple, and for the nipple to have an end region that expands in a step and reaches behind an inwardly projecting annular flange provided on the sleeve at its end facing the hose. The sleeve is therefore a part that can be manufactured separately from the nipple and pushed onto the nipple from behind before the nipple is inserted into its associated hose line. It is advantageous for the inner sealing surface of the nipple to project torically into the nipple throughhole. This toric, inwardly projecting area of the inner sealing surface forms the actual sealing surface opposite the connecting piece inserted into the nipple; in front of and behind this sealing surface, the inner wall of the nipple therefore recedes somewhat, so that lime and chemical deposits in this area cannot prevent insertion and withdrawal of the connecting piece.

The sealing effect can be improved if the connecting piece contains as a sealing surface a ring seal inserted into an outer annular groove in the connecting piece.

It is advantageous for the catch projections to extend to the free end of the sleeve and to form thereby at the open end of the sleeve circumferential faces with a smaller inner diameter and circumferential faces with a larger inner diameter. This facilitates connecting the hose coupler, since the workman can see at the open end of the sleeve the position of the catch projections within the sleeve and is therefore able to insert the connecting piece into the sleeve immediately in the correct relative position.

It is convenient for the locating faces for the compression spring to be formed by the catches on the connecting piece.

In an advantageous embodiment, provision is made for the locking lugs on the catches to be bounded on at least one side by a sliding surface that lies in a plane inclined in relation to the longitudinal axis of the connecting piece, the locking lug tapering toward its free end, and for the recess in the associated catch projection on the sleeve to be complementary in shape. The inclined sliding surface facilitates release of the hose coupler. When the connecting piece is turned in relation to the hose nipple, the two sections are forcibly displaced in relation to each other by the sliding surface in an axial direction as well, the locking lug being ejected from the recess in the catch projection.

The locking lug may in a preferred embodiment have on its side facing the sliding surface a lateral face parallel to the longitudinal axis of the connecting piece. It is particularly advantageous for the locking lug to likewise be bounded on its side facing the sliding surface by a lateral face inclined oppositely to the sliding surface. This provides the effect described above of forcible axial displacement when the parts are turned in both directions; in addition, the locking lug centers itself automatically in the catch recesses when the holes coupler is under pressure.

The locking lug may be bounded at its free end by an end face lying in a plane perpendicular to the longitudinal axis of the connecting piece.

It is preferable for two catch projections and catches each to be provided, which lie diametrically opposite one another in pairs.

It is also advantageous if the catch projections and catches both extend circumferentially less than 90°.

Figure 3:
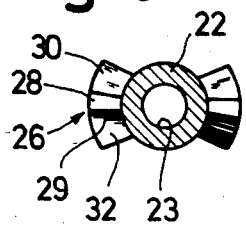
Figure 2:
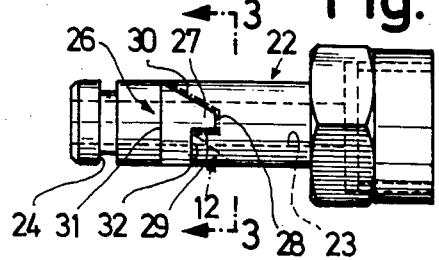
Figure 5:
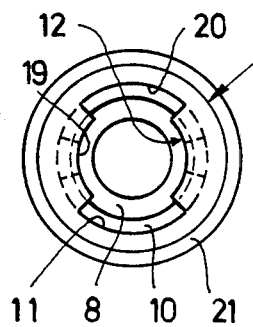
Figure 4:
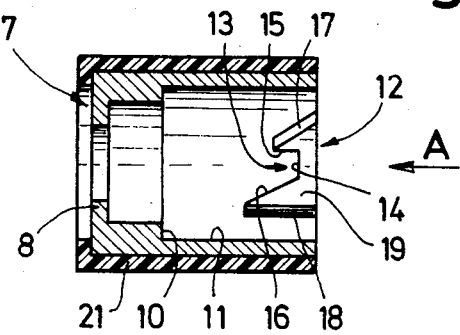

The following description of preferred embodiments of the invention will provide in connection with the drawing a more detailed explanation. The drawing shows:

FIG. 1 a view of a hose coupler in longitudinal section;

FIG. 2 a side view of the hose connecting piece attached to one hose end;

FIG. 3 a sectional view along line 3—3 in FIG. 2;

FIG. 4 a view in longitudinal section of the sleeve surrounding the hose nipple; and FIG. 5 a view in the direction of arrow A of the sleeve represented in FIG. 4.

The hose coupler illustrated in the drawing contains a hose nipple 2 with an inner throughhole 3, tightly connected to a first hose end 1. Hose nipple 2 is enlarged in a radial direction so that between hose end 1 and its free end a radially outwardly projecting step 4 is formed. In this enlarged region its inner hole 3 also has a larger diameter than in the region adjacent to hose end 1. In the enlarged section of hose nipple 2, the inner wall 5 of inner hole 3 forms an inner sealing surface which over a portion of its axial extension projects torically inward into inner hole 3. This toric thickening 6 forms the actual sealing surface, as explained in further detail below.

Hose nipple 2 is surrounded by a sleeve 7, which reaches behind step 4 in hose nipple 2 by means of an annular flange 8 pointing radially inward. It therefore slides axially but is held captive on hose nipple 2. Sleeve 7 projects beyond the free end of hose nipple 2 and is open at its own free end. Inside sleeve 7 is a helical compression spring 9 which is supported on one hand by an annular shoulder 10 in sleeve 7 on the other by two catch projections 12 disposed at the inner wall 11 of sleeve 7 which extend diametrically opposite each other into the cavity in sleeve 7, and whose design may be seen most clearly from FIG. 4. These catch projections extend circumferentially only so far that between the two catch projections a free insertion area remains. On its side facing hose end 1, each catch projection 12 has a recess 13 open toward hose end 1 which is bounded by a bottom 14 parallel to its circumference, a lateral contact face 15 parallel to its longitudinal axis, and a sliding surface 16 inclined in relation to the longitudinal axis (FIG. 4). Sliding surface 16 projects beyond the end of lateral contact face 15 facing the hose, in the direction toward hose end 1. Contiguous to the end of lateral contact face 15 facing the hose is a sliding surface 17 likewise inclined in relation to the longitudinal axis. Sliding surface 17 is essentially parallel to sliding surface 16 and extends in the embodiment illustrated to the free end of sleeve 7. On the opposite side, catch projection 12 is bounded by a lateral surface 18 which is parallel to the longitudinal axis of sleeve 7 and essentially parallel to lateral contact The side of catch projection 12 facing hose end 1 is in alignment with the open end of sleeve 7, so that the opening of sleeve 7, as may be seen from FIG. 5; has circumferential faces 19 with a smaller inner diameter which are bounded by catch projections 12, and circumferential faces 20 with a larger inner diameter which are located between the catch projections.

Sleeve 7 is enclosed by a protective covering 21 made of thermoplastic plastic, which serves on one hand as a thermal insulator and on the other as an aid to manipulation. For the latter purpose the protective cover may be knurled on its outer perimeter.

The other hose end is attached to a connecting piece 22, whose outer diameter corresponds essentially to the inner diameter of inner wall 5 of inner hole 3 in the enlarged region of the latter. Connecting piece 22, which also has an inner throughhole 23, may be mounted on the high-pressure cleaning unit itself and there form the delivery outlet of the latter. Inserted in a circumferential groove 24 is a flexible ring seal 25 that projects slightly beyond the outer perimeter of connecting piece 22.

Located on the peripheral surface of the connecting piece are also two catches 26, positioned diametrically opposite each other and extending outwardly beyond the peripheral surface of connecting piece 22, which extend in a circumferential direction only so far that between them an angular area remains which is at least as large as that over which catch projections 12 extend on the inner wall of sleeve 7. On the other hand, catches 26 extend over an angle that is smaller than that occupied by the free inner wall between catch projections 12 in sleeve 7.

Each catch 26 bears on its side toward the free end of connecting piece 22 a locking lug 27 whose shape is essentially complementary to that of recess 13 in catch projection 12 on sleeve 7. Locking lug 7 is therefore bounded on its side facing the free end by a parallel surface 28 which is parallel to its perimeter and adjacent to which are on one side an axially parallel lateral surface 29 and on the other, a sliding surface 30 inclined in relation to the longitudinal axis, the inclination of sliding surface 30 being so chosen that the locking lug tapers towards its free end (FIGS. 2 and 3). Sliding surface 30 extends over the entire axial extension of catch 26 up to an end face 31 parallel to the circumference of connecting piece 22, while laterial surface 29, parallel to its axis, extends only over a portion of the axial extension of catch 26, up to an end face 32 parallel to its circumference, the two end faces 31 and 32 enclosing between themselves a catch section parallel to the circumference of connecting piece 22 in the form of an annular shoulder.

To make a hose connection, the open end of connecting piece 22 is inserted into sleeve 7. In this process the angular position between sleeve and connecting piece is so chosen that catches 26 on the connecting piece can be inserted into the sleeve through the circumferential face 20 with the larger inner diameter, the catch projection on the inner wall of the sleeve passing between catches 26 on the connecting piece. Then the connecting piece is turned in relation to the sleeve such that sliding surface 30 on catches 26 slides along sliding surface 17 of the catch projections, as a result of which the connecting piece is at the same time also inserted in an axial direction farther into the sleeve. This brings end faces 31 of catches 26 into the position against compression spring 9 and compresses the latter, the compression spring being lifted from the catch projections. At the same time, the free end of the connecting piece is inserted by this motion into the hose nipple. As the connecting piece is turned farther in relation to the sleeve, parallel surfaces 28 of the catches finally pass over the edges of the catch projection formed by sliding surfaces 17 and lateral contact face 15 into the area of recess 13. Under the action of compressed compression spring 9, the connecting piece is now displaced such that locking lugs 27 on catches 26 snap into recesses 13 in catch projections 12, as may be seen from the illustration in FIG. 2, in which a connecting piece catch 26 is indicated by a solid line and a sleeve catch projection is indicated by a dotted-and-dashed line. In this position ring seal 25 lies against the toric thickening 6 of inner wall 5 of hose nipple 2, as illustrated in FIG. 1, so that in this area an effective seal is produced. Connecting piece and nipple can no longer be pulled apart in an axial direction in this position. Turning the two parts in relation to each other is likewise no longer possible without further ado, since the compression spring is pushing locking lugs 27 into recesses 13, which are secured there in an essentially positive manner.

If the hose line is now pressurized, the two sections are drawn apart and securely fixed under the effect of the pressure drop in the line. It is impossible in operation for a workman to push the two sections toward each other against the force of the pressure in the hose and thereby release them.

Releasing the hose coupler is only possible when the hose is again free of pressure. To release the coupler, the connecting piece and sleeve are then slid toward each other in an axial direction, compressing the compression spring. This displacement can be achieved by again turning the two parts in relation to each other, since this rotation causes sliding surfaces 30 on the catches to slide along sliding surfaces 16 on the catch projections. As soon as the compression spring is compressed, sleeve and connecting piece are turned in the opposite direction in relation to each other until catches 26 are again aligned with the circumferential faces 20 with the larger inner diameter. In this angular position the connecting piece may be withdrawn from the sleeve.

In a modified embodiment of the invention not illustrated in the drawing, the shaping of recesses 13 and complementarily formed recesses 27 can be modified by replacing bottom 14 and lateral contact faces 15 with a single diagonal surface inclined in the direction opposite to that of sliding surfaces 16 and 17. In the same manner, parallel surface 28 and lateral surface 29 are replaced by a single diagonal surface inclined in the direction opposite to that of sliding surface 30.

It is also advantageous that in inserting the connecting piece into the sleeve, rotation of the two sections is possible in only one direction; when they are rotated in the opposite direction, catches 26 push against axially parallel surfaces 18 of the catch projections and prevent rotation in this direction.

We claim:

1. A coupler for hose lines of high pressure cleaning equipment and high-pressure spraying equipment comprising
   a nipple attached to the end of a first hose and having an inner throughhole forming an inner sealing surface, said nipple being surrounded by a sleeve which is open at its end facing a second hose, secured against displacement in the direction of the second hose, and bears on its inner side catch projections which extend into the interior of said sleeve and are separated by a wall area free of said catch projections, said catch projections characterized by a recess on the side facing the first hose which has a surface inclined in relation to the longitudinal axis of said sleeve,
   a connecting piece attached to the end of the second hose and having an outer sealing surface which lies in sealing contact with the inner sealing surface of said nipple when said connecting piece is inserted into said nipple, said connecting piece having on its outer wall outwardly projecting catches which are complementary to the catch projections of the sleeve, extending circumferentially over an area maximally as great as the area on the inner wall of the sleeve free of the catch projections, and which have on their side facing the second hose, locking lugs which slip into the recesses in the catch projections of said sleeve, and
   a compression spring between said nipple and said connecting piece, characterized in that the compression spring is located between the inner wall of the sleeve and the nipple and is supported by an inward projection of the sleeve adjacent the first hose and by the catch projections on the connecting piece, said projections having locating faces for the compression spring against which the compression spring rests when the connecting piece is inserted into the sleeve the locking lugs on the catches on the connecting piece being bounded on their front edge relative to the direction of turning by a surface inclined relative to the longitudinal axis of the connecting piece towards its free end.

2. A coupler as described in claim 1, characterized in that the inner sealing surface of the nipple projects torically into the inner through hole of the nipple.

3. A coupler as described in claim 1, characterized in that the locating faces for the compression spring are formed by the catches of the connecting piece.

4. A coupler as described in claim 1, characterized in that the locking lug has on its side opposite the sliding surface a lateral face parallel to the longitudinal axis of the connecting piece.

5. A coupler as described in claim 1, characterized in that the locking lug is further bounded on its side opposite the inclined surface by a sloping lateral face inclined contrary to the inclined surface.

6. A coupler as described in claim 1, characterized in that the locking lug is bounded at its free end by a surface lying in a plane perpendicular to the longitudinal axis of the connecting piece.

7. A coupler as described in any of the claims 1, 4, 5 or 6, characterized in that the catch projections of said sleeve have surfaces inclined in relation to the longitudinal axis of the sleeve against which the inclined surfaces of the locking lugs rest when the connecting piece is inserted into the sleeve and rotated in relation to the sleeve such that the connecting piece, when rotated further in relation to the sleeve, is inserted into the nipple.

8. A coupler as described in claim 7, characterized in that the catch projections are bounded on their sides opposite the inclined surfaces by lateral surfaces parallel to the axis of said connecting piece which form stopping faces for the catches of the connecting piece and prevent any further rotation of the connecting piece relative to the sleeve.

* * * * *